Figure 1:
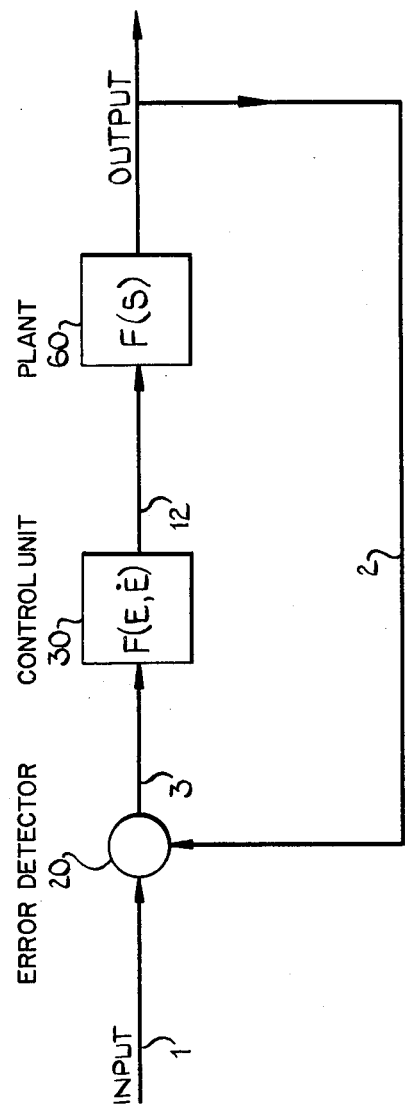

United States Patent [19]

Johnson et al.

[11] 4,197,577

[45] Apr. 8, 1980

[54] CONTROL SYSTEM

[75] Inventors: Christopher L. Johnson, Hartshorne N. Burton-on-Trent; Peter J. Stratton, Spondon, both of England

[73] Assignee: Rolls-Royce Limited, London, England

[21] Appl. No.: 923,308

[22] Filed: Jul. 10, 1978

[30] Foreign Application Priority Data

Jul. 16, 1977 [GB] United Kingdom ............... 29954/77

[51] Int. Cl.² ...................... G06G 7/66; G05B 13/02
[52] U.S. Cl. .................... 364/118; 318/561; 318/620; 364/105; 364/109; 244/195; 244/194;195
[58] Field of Search ............... 364/105, 118, 113, 109, 364/115; 318/611, 615, 616, 617, 618, 619, 620, 621, 630, 561

[56] References Cited

U.S. PATENT DOCUMENTS

| | | | |
|---|---|---|---|
| 3,624,367 | 11/1971 | Hamilton et al. | 364/105 X |
| 3,655,954 | 4/1972 | Speth | 364/105 |
| 3,786,242 | 1/1974 | Brooks | 364/118 X |
| 3,925,640 | 12/1975 | Duggan | 364/118 |
| 4,006,346 | 2/1977 | Pemberton | 364/118 |

FOREIGN PATENT DOCUMENTS 1413791 11/1975 United Kingdom ..................... 318/561

*Primary Examiner*—Joseph F. Ruggiero
*Attorney, Agent, or Firm*—Cushman, Darby & Cushman

[57] ABSTRACT

A control system of the non-linear type which behaves in a substantially 'proportional' manner. The system comprises an error detector which compares the input and output of a plant to obtain an error value, and a control unit which derives from the error value a continuous control signal for the plant. The control signal comprises a linear term which is a linear function of the error signal and a nonlinear damping term which is a continuously variable function comprising the ratio of the rate of change of the error signal and the error itself.

11 Claims, 4 Drawing Figures

CONTROL SYSTEM

This invention relates to control systems and is particularly concerned with a control system for a plant in which rapid adjustments are needed to maintain optimum performance of the plant and/or to prevent damage from occurring. An object of the invention is to provide a control system which will substantially improve the performance of control systems beyond the capabilities of purely linear devices or known non-linear additions.

The applications in which improvements are most required are complex systems involving interactions between control computing elements, actuating power supplies, the power plant and perhaps a vehicle, e.g. gas turbine engines with reheat and/or supersonic intakes, and helicopters with rotor speed governing.

Linear control systems or servo mechanisms are systems whose output may be described with sufficient accuracy by linear differential equations including derivatives of the varying input and output.

A particular property of linear systems is that if they are supplied with a continuous sinusoidal input, then, after initial disturbances have died away, the output is sinusoidal at the same frequency, but usually of different amplitude and phase. A more general property of linear systems is that if the input is increased in a given ratio, then the output is increased by the same ratio i.e. they are "proportional".

All known non-linear systems lack the former property since, by definition, they do not obey linear rules, and most known non-linear systems lack the latter general property.

Known examples of non-proportional non-linear systems may differ from linear systems by lack of response to small input amplitudes owing to friction or backlash or to large amplitudes owing to their reaching the maximum rate of response of some component (called "saturation"). These types of response may be inherent in some devices but are not usually advantageous. Known non-linear methods of control which achieve some useful results include systems whose rate of response increases abruptly for large errors. These only deal with these large errors, and are almost always unsatisfactory near the boundary where the rapid response commences. Other known non-linear methods of control include so called "optimal" systems, which include devices which predict the best moment to apply full corrective power, but these tend to produce violent correction for small errors. There are also "adaptive" systems which measure the response of the plant in some way, and adjust the control to give some desired response characteristic. If this adjustment is too fast, it might cause instability whereas if it is too slow damage may occur, for example in engines and vehicles, before a slow stable adaptive system can adjust.

A typical plant which is very difficult to control by conventional linear methods is a plant known as a double integrator, because as is well known in the art, the lag in the feedback is excessive.

An example is a gas turbine engine reheat nozzle control having a pressure ratio measuring device with an output to a hydraulic jack whose velocity of movement is proportional to the error from the desired pressure ratio. This constitutes the first integrator.

The hydraulic jack varies the stroke of an hydraulic plunger pump feeding fluid to further jacks which move the reheat nozzle flaps at a velocity proportional to the flow from the plunger pump. This forms the second integrator, assuming the measured pressure ratio to be functionally dependent upon the nozzle flap position.

As described this system would be unstable as explained above.

The normal practice in the present state of the art is to introduce positional feedback to convert one of the integrators into a proportional control device. This can be done, for example, by fitting a feedback link which modifies the apparent pressure ratio error of the pressure ratio measuring device in proportion to the departure of the ratio from the balance position. Alternatively, the response of the nozzle flap actuating jacks can be made proportional by combining the movement of the hydraulic jack with the movement of the nozzle flaps via a feedback link, and controlling the stroke of the hydraulic plunger pump with the resultant.

In each of our prior British Pat. Nos. 1,413,791 and 1,416,401 there is described and claimed a control system for producing an output signal, which is substantially proportional to an input signal (in the sense hereinbefore defined) comprising at least two linear modes of operation, each having a different rate of response, the system changing from one mode to another in accordance with the ratio between the rate of change of a variable to the variable itself, such as the rate of change of the error and the error.

It is an object of the present invention to provide a non-linear control system which will substantially retain the general property of linear systems of proportionality to input amplitude so that if the response is optimal at any amplitude it will be at other amplitudes and the system will not make violent corrections for small errors.

According to the present invention, a control system adapted to control a plant to produce an output which is substantially proportional to an input comprises means for comparing the input with the output to produce an error signal and means adapted to produce from the error signal a continuous control signal for the plant, the control signal comprising a linear term which is a linear function of the error signal and a non-linear damping term which is a continuously variable function comprising the ratio of the rate of change of the error signal and the error signal itself.

Preferably the continuously variable function comprises the modulus of the ratio of the rate of change of the error signal to the error signal itself.

Thus for a large error with a low rate of change the damping term is small and for small errors the damping term is large.

Preferably the continuously variable function is limited to a maximum value whereby for very small error signals the damping term does not become excessively large.

The damping term may, in an alternative embodiment, include a negative constant which could give rise to negative damping when the modulus has a low value. In this case it may be desirable to arrange that the damping factor becomes zero when the sum of the continuously variable function and the negative constant is negative.

The control signal is thus generated by a linear term and a damping term, the damping term varying in a non-linear manner but arranged so that the control signal is substantially proportional to the input signal.

To explain how this can be achieved, consider a plant whose response may be defined by a second order differential equation and which would take the form of a double integral if no damping was present. For simplicity, consider the response of the system after a disturbance in the input signal, such as a step change, which has changed the level of the input signal and which is no longer varying the input signal. Under these conditions, the differential equation can be written in terms of the error E between the input and the plant output and its derivatives without referring to the input or output signals explicitly.

In its simplest form, the equation is $$\ddot{E} + 2Z(E,\dot{E})\dot{E} + E = 0$$

where $Z(E,\dot{E})$ is the damping function.

The Damping Function $Z(E,\dot{E})$ is multiplied by the coefficient 2 because in the theory of linear systems it is convenient to write the damping as $2\rho$ where $\rho$ is a constant. In our prior British Pat. Nos. 1,413,791 and 1,416,401 the damping term is changed between two or more constant values. However, Z may have any form, but to retain the advantages of a proportional system, it must be what is known as a "non-dimensional" or "dimensionless" function of $E,\dot{E}$ or other derivatives. A simple function having this property is $$K \left| \frac{(\dot{E})}{(E)} \right|$$

where | | represents the modulus of the non-dimensional ratio and is defined to be positive, and K is a constant. However this function may become very large when the error is small producing very heavy damping. To avoid this, the ratio is preferably limited to a maximum value which is equivalent to introducing another mode with a constant damping term. It can easily be shown that because the change between modes takes place at a constant ratio ($\dot{E}/E$) the control system based on these two damping modes has the required proportional property.

Figure 2:
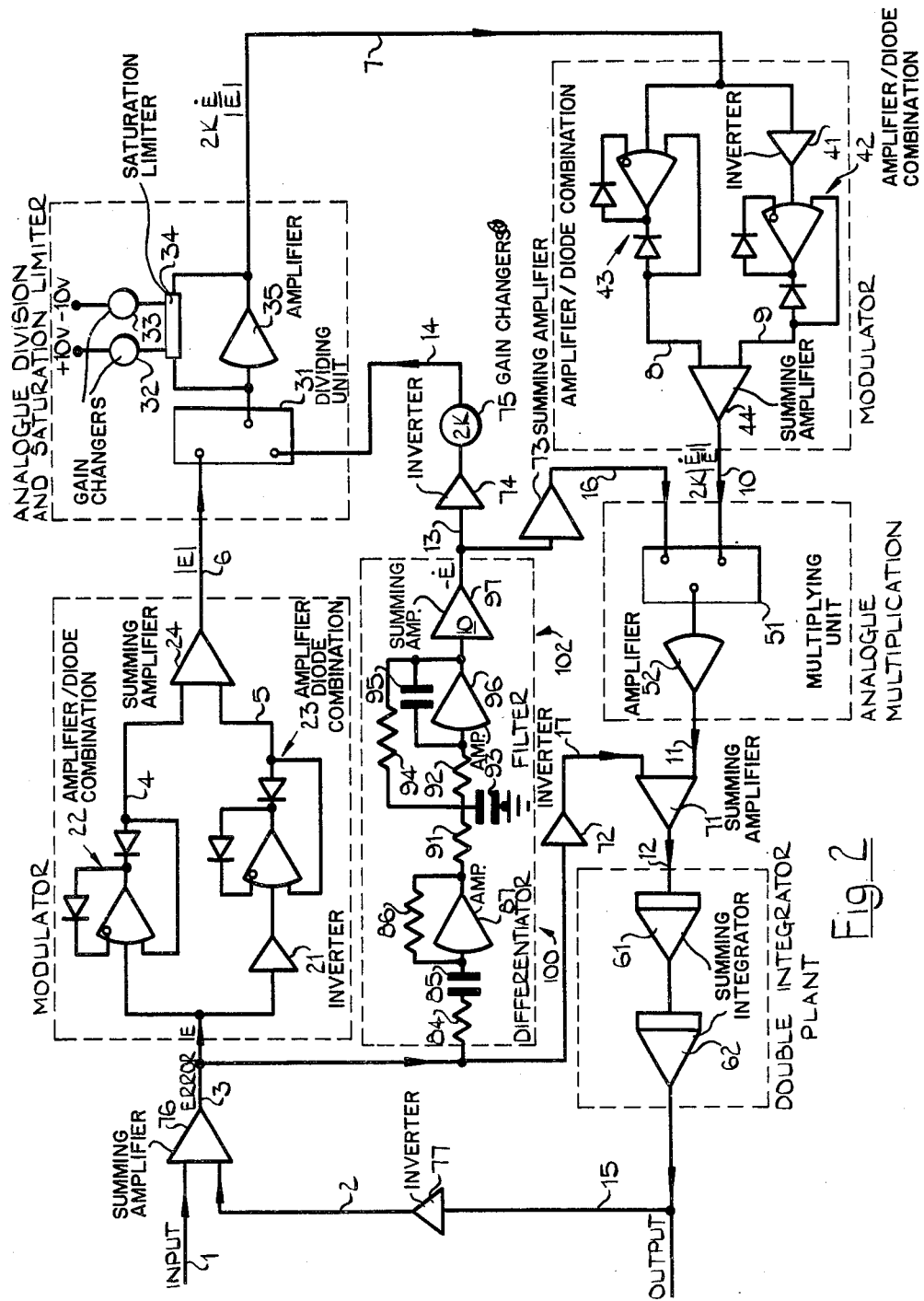
Figure 3:
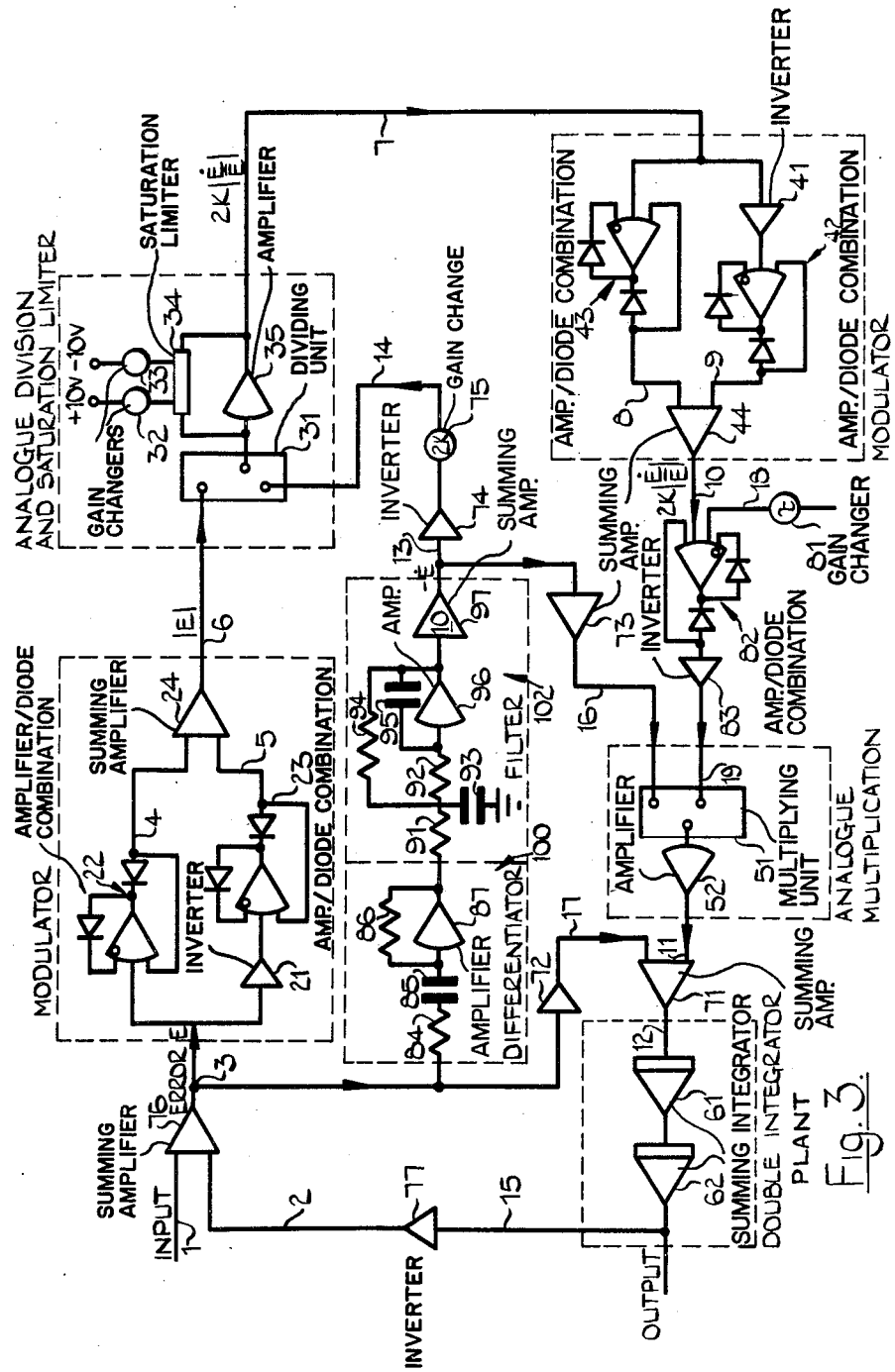
Figure 4:
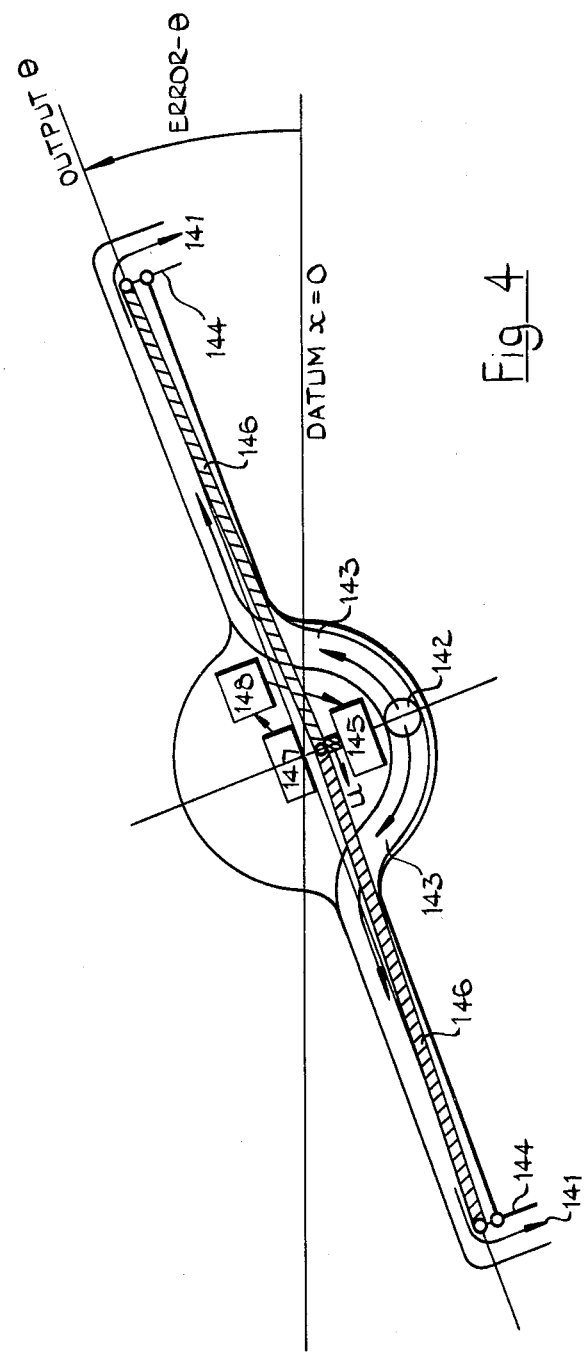

Embodiments of the invention will now be described by way of example only with reference to the accompanying drawings in which:

FIG. 1 is a schematic diagram indicating the basic components of a control system in accordance with the invention, FIG. 2 shows an electrical analogue implementation of the control system according to the invention adapted to control a double integral plant, FIG. 3 is a modification of the system shown in FIG. 2, and FIG. 4 shows a diagrammatic front view of an aircraft incorporating a control system in accordance with the invention.

FIG. 1 shows schematically a closed loop control system in which the output from the system is compared with the input and the error is amplified and used to modify the output in a manner that is intended to reduce the error.

The input to the control system is fed, through line 1, into an error detector 20, the error detector also being fed with an output signal along line 2, from the plant 60 being controlled.

The error detector is connected through line 3 to a control unit 30 which in turn is connected through line 12 to the plant 60 which produces a final output to follow the input and which is fed back through line 2, to the error detector 20 to determine the error.

The control unit 30 computes, from the error signal, a function of the error signal and its derivatives such that when this function is fed to the plant, the plant is activated such that its output is made to comply with the input, i.e. to achieve zero error in a fast but stable manner.

FIG. 2 shows, an electrical analogue implementation of a control system according to an embodiment of the present invention for controlling a double integral plant.

In the system of FIG. 2, the error detector consists of a summing amplifier 76, which is fed with the input signal along line 1 and an output signal along line 2. The output signal is derived from the plant and is fed, via line 15, through an inverter 77 to the summing amplifier 76.

The output of the summing amplifier 76 is fed via line 3 to an inverter 21 and to an amplifier/diode combination 22. The output of inverter 21 is then fed to a further amplifier/diode combination 23, which has its output along line 5 to an input of a summing amplifier 24. The output of the amplifier/diode combination 22 is also connected, via line 4, to an input of the summing amplifier 24.

The amplifier/diode combinations 22 and 23 (and 42, 43 mentioned hereafter) are known in the art and effectively give substantially perfect diode characteristics except for the sign change associated with the amplifier.

The arrangement of components 21, 22, 23 and 24 is such that the output of the summing amplifier 24 is the modulus of the signal along line 3, i.e. the modulus of the error, scaled by a suitable factor say 10.

The output |E| of the summing amplifier 24 is then fed, along line 6, to the denominator input of a dividing unit 31.

The error, on line 3, is also fed to a differentiator network 100 consisting of resistors 84 and 86, a capacitor 85 and a high gain amplifier 87. The output of this differentiator $\dot{E}$ is then fed through a filter circuit 102 consisting of resistors 91, 92 and 94, capacitors 93 and 95, a high gain amplifier 96 and a summing amplifier 97. This filter circuit prevents noise generation and limits the value of the error velocity signal $\dot{E}$ for very fast changes of the error signal E. The various amplifiers change the sign of the signal, hence the output becomes $-\dot{E}$.

The output of the filter circuit is fed along line 13 to an inverter 74 which corrects the sign of the signal and then passed through a gain changer 75 which introduces the constant factor 2K before being fed along line 14 to the numerator input of the dividing unit 31.

The output $$\frac{2K\dot{E}}{|E|}$$

of the dividing unit 31 is limited by a saturation limiter 34 and gain changers 32 and 33 to prevent amplifier 35 from saturating. In addition to preventing saturation of the amplifier 35 the limiter 34 prevents the damping term exceeding a limit preset by the gain changes 32 and 33. In this way very high damping terms, which might occur when the error is very small, are avoided.

The output of the amplifier 35 is connected along line 7 to an amplifier/diode combination 43 and an inverter 41. The output of inverter 41 is then fed through an amplifier/diode combination 42 and into a summing amplifier 44 via line 9. Line 8 connects the output of the amplifier/diode combination 43 with the input of the summing amplifier 44.

Components, 41, 42, 43 and 44 cause the output of the summing amplifier 44 to be the modulus of the signal along line 7. This modulus $$2K\left|\frac{\dot{E}}{E}\right|$$

is then fed along line 10 to one input of a multiplying unit 51. Another input to the multiplying unit 51 is supplied along line 16, with a signal −E from the filter network 102 via summing amplifier 73.

The product of the two inputs $$-2K E\left|\frac{\dot{E}}{E}\right|,$$

on lines 10 and 16, is fed out of the multiplying unit 51, through an amplifier 52 which restores its positive sign and into a summing amplifier 71. The system error on line 3 is also fed into the summing amplifier 71 via an inverter 72 which gives it a negative sign, i.e. −E. The output of the summing amplifier is therefore $$-(E - 2KE\left|\frac{\dot{E}}{E}\right|)$$

which is of the form required for the conrol signal. If a factor L is required to operate on the linear term E, a gain changer may be used.

Line 12 carries the control output of the summing amplifier 71 into the double integral plant which is represented by summing integrators 61 and 62.

Thus the control signal to the double integral plant takes the form $$LE - 2K\left|\frac{\dot{E}}{E}\right|E$$

in which LE is a linear forcing term and $$-2K\left|\frac{\dot{E}}{E}\right|E$$

is a damping term.

If the input signal suddenly experiences a step change, then a sudden large error would result and the following table indicates step by step how the system reacts.

|   | error and error velocity | LE | $-2K\left|\frac{\dot{E}}{E}\right|\dot{E}$ |
|---|---|---|---|
| 1 | E large<br>Ė zero | large reaction | zero damping |
| 2 | E large<br>Ė small | large reaction | light damping |
| 3 | E large | large | medium |

-continued

|   | error and error velocity | LE | $-2K\left|\frac{\dot{E}}{E}\right|\dot{E}$ |
|---|---|---|---|
|   | Ė large | reaction | damping |
| 4 | E small<br>Ė large | small reaction | very heavy damping |
| 5 | E small<br>Ė small | small reaction | medium damping |
| 6 | E approaching zero<br>Ė small | very small reaction | damping term reaches a maximum value |

FIG. 3 shows a further embodiment of the invention, which is numbered in the same way as FIG. 2, but in addition to the features described above the output of the summing amplifier 44 is fed along line 10, through an amplifier/diode combination 82 and an inverter 83 before being fed into the multiplying unit 51, along line 19. A further negative constant input −τ to the amplifier/diode combination 82 is supplied, via line 18, from a gain changer 81. The effect of these additional components is to keep the output of the inverter 83 at zero until the summation of the signals on lines 10 and 18 is positive. When the summation of the signals on lines 10 and 18 is positive then the output of inverter 83 will represent this summation. Because the output of the amplifier 44 is $-2K(\dot{E}/E)$, this means that there is no output from inverter 83 if $-\tau + 2K(\dot{E}/E)$ is negative, i.e. $2K(\dot{E}/E) < \tau$. In this case, therefore, the damping term in the system equation becomes $$\dot{E}(2K\left|\frac{\dot{E}}{E}\right| - \tau)$$

as long as $$(2K\left|\frac{\dot{E}}{E}\right| - \tau)$$

is positive, or zero if this term becomes negative. The physical effect of this is that while Ė is small (e.g. immediately after a step change in input) the factor $$(2K\left|\frac{\dot{E}}{E}\right| - \tau)$$

in the damping term would become negative. This would reinforce the efforts of the plant to respond to the change in input, but the plant may not be able to accept this reinforced response. Hence the layout is arranged to produce a zero damping factor as long as the factor $$(2K\left|\frac{\dot{E}}{E}\right| - \tau)$$

is negative. This allows the plant to respond at its own natural rate, unreinforced and undamped by the control system, until (Ė/E) reaches such a value as to make the factor positive.

The arrangement of FIG. 3 thus provides certain advantages over that of FIG. 2, at least in its speed of response to a step change in input.

In FIG. 4 there is shown a non-linear control system used in conjunction with an air jet system to implement the attitude control of a hovering VTOL aircraft.

Air jets 141 are supplied with air from a compressor 142 via ducts 143. The total flow of air is constant at a given condition of the compressor, but the ratio of flow between each of two air jets 141 can be altered by means of flap valves 144 which are moved by an actuator 145 via linkages 146. A sensing device 147 detects departure of the attitude of the aircraft from a horizontal datum and generates an error signal proportional to the deviation.

This error signal is fed to a control device 148 which differentiates it and uses the resultant error velocity signal along with the error signal to produce a control signal by means of non-linear control network as in FIG. 2 included in device 148. This control signal is fed to the actuator 145 which moved the linkages 146 in proportion to the magnitude of the control signal. This movement alters the positions of the flap valves 144, which causes an alteration in the relative air flow between the two jets so as to produce a torque acting on the aircraft in such a manner as to decrease the deviation.

Whilst a control system has been described which utilizes electronic components, it will be appreciated that the control system may utilise mechanical, fluidic or other suitable elements to achieve the appropriate signals.

We claim:
1. A control system for controlling a plant comprising:
   an error detector for comparing an input signal with a plant output signal and for producing an error signal (E); and
   a control unit coupled to said error signal for producing a continuous control signal for said plant, said control signal comprising a linear component which is a linear function of said error signal and a non-linear damping component which is a continuously variable function comprising a term defined by the ratio of the rate of change of said error signal to said error signal itself.
2. A control system according to claim 1 wherein said continuously variable function comprises a term defined by the modulus of the ratio of the rate of change of said error signal to said error signal itself.
3. A control system according to claim 2 wherein said continuously variable function further includes a negative constant term.
4. A control system according to claim 3 wherein said continuously variable function has a zero value whenever the sum of said modulus term and said negative constant term is a negative value.
5. A control system according to claim 2 further including means for limiting the value of said continuously variable function to a predetermined maximum value at which said maximum value said system operates as a linear control system.
6. A control system according to claim 1 wherein said linear function of said error signal comprises a term defined by said error signal multiplied by a constant factor.

7. A control system according to claim 1 wherein said damping term comprises a term $$\dot{E}\left|\frac{E}{E}\right|$$

where $\dot{E}$ represents the rate of change of said error signal.

8. A control system according to claim 1 wherein said damping term comprises a term $$\dot{E}\left(2K\left|\frac{E}{E}\right| - \tau\right)$$

where $\dot{E}$ represents the rate of change of said error signal and $\tau$ represents a first contant.

9. A control system according to claim 1 wherein said damping term comprises a term $$\dot{E}\left(2K\left|\frac{E}{E}\right| - \tau\right)$$

where $\dot{E}$ represents the rate of change of said error signal, $\tau$ represents a first constant and K represents a second constant.

10. A control system according to claim 2 wherein said control unit comprises:
   first means for coupling to said error signal and for deriving a first signal defined by $|E|$ where $|E|$ represents the modulus of said error signal;
   second means for coupling to said error signal and for deriving a second signal defined by $\dot{E}$ where $\dot{E}$ represents the rate of change of said error signal;
   third means coupled to said second means for deriving a third signal defined by $2K\dot{E}$ where K is a first constant;
   divider means coupled to said first and third means for deriving a fourth signal defined by $$\frac{2K\dot{E}}{|E|};$$

fifth means coupled to said divider means for deriving a signal defined by $$2K\left|\frac{\dot{E}}{E}\right|, \text{ where } \left|\frac{\dot{E}}{E}\right|$$

represents the modulus of the ratio of the rate of change of said error signal to said error signal; and
   multiplier means coupled to said second means and to said fifth means for deriving said damping component defined by $$2K\dot{E}\left|\frac{\dot{E}}{E}\right|.$$

11. A control system according to claim 10 wherein each of said means are electronic means.

* * * * *